United States Patent Office 3,773,905
Patented Nov. 20, 1973

3,773,905
METHOD OF PREPARING HIGH-PURITY AMMONIUM ALUMINUM HEXAFLUORIDE
Ronald H. Arendt, Schenectady, N.Y., assignor to General Electric Company
No Drawing. Filed Jan. 4, 1971, Ser. No. 103,794
Int. Cl. C01c 1/16, 1/28; C01f 7/00
U.S. Cl. 423—465
2 Claims

ABSTRACT OF THE DISCLOSURE

Ammonium aluminum hexafluoride suitable for the production of semiconductor substrates of ultra high purity aluminum nitride is prepared by reacting aluminum with a stoichiometric excess of HF to provide an aqueous solution of $H_3AlF_6$ and HF, and neutralizing this solution with $NH_4OH$ and raising the pH to about 9 and thereby forming and precipitating $(NH_4)_3AlF_6$.

---

This invention relates to the semiconductor art and is more particularly concerned with a novel method of preparing ammonium aluminum hexafluoride [$(NH_4)_3AlF_6$] of extremely high purity and therefore suitable for use in the production of aluminum nitride (AlN) semiconductor substrates and heat sinks.

Because of its thermal conductivity and compatibility with semiconductor materials, aluminum nitride has special utility for the dissipation of heat and possible value as a semiconductor device substrate material and heat sink material. It is, however, comparatively expensive and, even so, is not available on the market in purity greater than 98 percent, which is marginal for semiconductor applications. For such purposes, aluminum nitride preferably will contain less than 0.1 weight percent $Al_2O_3$, only a few parts per million of iron, and the cationic content of other impurities will likewise be in the low parts-per-million range.

In accordance with this invention based upon my discoveries to be described, aluminum nitride can now be produced in substantially greater purity than the presently available commercial grade. In fact, even higher purity material can be made because this method provides 99.98 percent ammonium aluminum hexafluoride as the source of aluminum nitride. Consequently, in contrast to the prior art practice which involves reacting aluminum trifluoride with ammonia

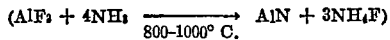

ammonium aluminum hexafluoride prepared in accordance with the method of this invention in extremely high purity is heated under an ammonia atmosphere and thereby reacted to yield high-purity aluminum nitride.

The preparation of such high-purity ammonium aluminum hexafluoride is enabled in part by the key step of providing an aqueous solution of $H_3AlF_6$ and HF containing only comparatively small amounts of impurities. It is also made possible by the critical step of neutralizing this solution with ammonia and thereby precipitating ammonium aluminum hexafluoride as the pH of the solution is raised to at least about pH 9. These steps are new and the process which includes them is a new combination of steps producing new results, all of which are attributable to two of my recent discoveries. Thus, I have found that the purity of the ultimate ammonium aluminum hexafluoride depends strongly upon maintaining a substantial proportion of HF in the $H_3AlF_6$ solution until the associated solid-phase impurities have been separated and removed from the solution. Secondly, I have discovered that it is critical to recovery of a high-purity product that the pH of the $H_3AlF_6$ acid solution be raised to a level of at least about 9 by the addition of ammonia and the conversion of the soluble compound into insoluble $(NH_4)_3AlF_6$. The consequences of failure to take these measures are that the yield of the desired product is diminished through the formation of a variety of $AlF_3$ and $NH_4F \cdot AlF_3$ hydrates and that the ultimate AlN product is contaminated with alumina.

Briefly, the method of this invention consequently comprises the steps of neutralizing an aqueous solution of $H_3AlF_6$ and HF and adjusting the pH of the solution to about 9 through the addition of ammonia and thereby forming and precipitating $(NH_4)_3AlF_6$ from the solution, and separating and removing the resulting precipitate from the solution. Preferably, HF will be employed in an amount approximately 10 percent in excess of the stoichiometric equivalent of aluminum. Also, it is desirable to use only sufficient ammonia to prevent contamination of the ammonium aluminum hexafluoride product by impurities insoluble at pH levels below about 9. A substantial excess of ammonia can be used without detriment to product quality but no advantage is gained at the cost of the additional ammonia.

In the best practice of this invention, aluminum of high purity, that is, at least 99.99 percent, and reagent-grade HF are employed as the source materials, the aluminum being in the form of pieces of small size to promote reaction. The aluminum is given a preliminary etch with a caustic soda solution to remove adhering oxides and organic residues and any metal particles embedded in the surface during prior processing.

The resulting clean aluminum pieces are then introduced into an HF aqueous solution of intermediate (suitably 30%) strength to produce a solution nearly saturated with $H_3AlF_6$ and containing an excess of HF about 10 percent over stoichiometry. The reaction may be carried out in a more dilute solution of HF if desired, but very low acid concentrations of the order of about one percent do not result in desirable reaction rates. In using stronger acid solutions, the reaction rate may tend to be too rapid, but can conveniently be controlled by placing the aluminum pieces in water and adding the HF in aliquots. As indicated above, the excess acid at this stage is important in preventing the precipitation or formation of any of the hydrates of aluminum or ammonium aluminum hexafluoride that might otherwise appear and reduce the yield of the desired product.

When the Al-HF reaction has substantially terminated, the $H_3AlF_6$-HF solution is filtered to remove undissolved solids therefrom. Then, as the next step, the filtrate is diluted with an equal volume of water in preparation for the critical neutralization step, which is carried out by the addition of ammonia suitably in the form of an $NH_4OH$ solution. The amount of ammonia used is sufficient to bring the pH of the diluted filtrate to about 9, this addition resulting in the conversion of substantially all of the $H_3AlF_6$ to $(NH_4)_3AlF_6$ which comes down as a precipitate. This precipitate is separated and removed from the liquid phase, washed to remove occluded water, $NH_4F$ and $NH_4OH$, and then dried in preparation for use in producing AlN as described above.

The following illustrative, but not limiting, example of this invention as it has been used in actual practice is provided to further inform those skilled in the art as to the present best mode of carrying out this invention:

Aluminum metal stock (99.99 percent aluminum) was cut into pieces of cubic form weighing approximately 50 grams each and immersed in 50 percent NaOH solution for 20 seconds to insure that the surfaces of these pieces were free from oxide and contaminating organic and inorganic materials. The freshly-etched aluminum chips were then immediately introduced into a volume of distilled water in the proportion of 6.5 ml. water per gram of metal. Reagent HF in amount of 8.46 ml. per gram of metal (and per 6.5 ml. of $H_2O$) was added to the water in six aliquots; the resulting reaction raised the temperature of the solution quickly from room-temperature level to about 80° C. The amount of acid used was in excess of that required to compensate for evaporation losses and was effective in suppressing precipitation of $AlF_3$ hydrates and $NH_4F \cdot AlF_3$ hydrates. The resulting $H_3AlF_6$-HF solution was then filtered to separate undissolved solids consisting of $AlF_3 \cdot XH_2O$, alkaline earth fluorides, and the like as well as any alpha-alumina not removed from the metal pieces during the preliminary cleaning step. The filtrate was then diluted with an equal volume of distilled water and 6 N $NH_4OH$ solution was added until the pH of the supernatant solution reached 9.0. The $(NH_4)_3AlF_6$ formed during this neutralization step was a fluffy, white, crystalline precipitate insoluble in the excess $NH_4F$-$NH_4OH$. Heat is also generated during this neutralization operation and is desirable in that it tends to improve the quality of the precipitate. This precipitate was then collected by filtration and washed five times with 95 percent ethyl alcohol, about 100 grams of the alcohol per 75 grams of precipitate being employed in each washing operation. The precipitate was then dried at 100° C. overnight and stored in a vacuum desiccator for eventual use in the production of AlN. The AlN produced from this precipitate on microscopic examination proved to contain no alpha-alumina, and also was found to be a superior quality product specially suited for use in semiconductor substrate production.

What I claim as new and desire to secure by Letters Patent of the United States is:

1. The method of preparing high-purity $(NH_4)_3AlF_6$ suitable for the production of semiconductor grade AlN which comprises the steps of cleaning and removing from the surface of a piece of aluminum of at least 99.99 percent purity substantially all adhering impurities, immersing the resulting clean aluminum workpiece in an aqueous HF solution prepared by mixing reagent HF with water in the ratio of 8.46 ml. of HF to 6.5 ml. of $H_2O$ per gram of aluminum and thereby providing a substantially saturated solution of $H_3AlF_6$ containing HF, then filtering the said saturated solution and thereby separating and removing undissolved solids therefrom, diluting the resulting filtrate with an approximately equal volume of water, adding $NH_4OH$ solution to the said diluted filtrate and thereby bringing the pH of the filtrate to about 9, converting substantially all the $H_3AlF_6$ to $(NH_4)_3AlF_6$ precipitate, separating and removing the precipitated $(NH_4)_3AlF_6$ from the liquid phase, washing the said precipitate with ethyl alcohol and thereby removing therefrom occluded water and $NH_4OH$, and finally drying the precipitate.

2. The method of preparing high-purity $(NH_4)_3AlF_6$ suitable for the production of semiconductor grade AlN which comprises the steps of cleaning and removing from the surface of a piece of aluminum of at least 99.99 percent purity substantially all adhering impurities, immersing the resulting clean aluminum workpiece in an aqueous HF solution containing a stoichiometric excess of HF separating and removing undissolved solids from the resulting reaction mixture, diluting the resulting filtrate with water, adding $NH_4OH$ solution to the said diluted filtrate and to bring the pH of the filtrate to about 9 and thereby precipitate $(NH_4)_3AlF_6$, and finally separating and removing the precipitated $(NH_4)_3AlF_6$ from the liquid phase.

References Cited

UNITED STATES PATENTS

| | | | |
|---|---|---|---|
| 3,049,405 | 8/1962 | Trupiano et al. | 423—465 |
| 2,920,938 | 1/1960 | Matoash | 23—88 |

FOREIGN PATENTS

| | | | |
|---|---|---|---|
| 62,317 | 6/1968 | East Germany | 423—465 |
| 528,206 | 7/1956 | Canada | 23—88 |

OTHER REFERENCES

J. W. Mellor's "A Comp. Treatise on Inorg. and Theo. Chem.," vol. 5, 1924 ed., pp. 209 and 210, Longmans, Green & Co., New York.

EDWARD STERN, Primary Examiner

U.S. Cl. X.R.

423—412; 472—472